United States Patent [19]

Tanaka et al.

[11] Patent Number: 4,512,751
[45] Date of Patent: Apr. 23, 1985

[54] METHOD AND SYSTEM FOR CONTROLLING CONTINUOUSLY VARIABLE V-BELT TRANSMISSION

[75] Inventors: Yoshikazu Tanaka, Yokohama; Sigeaki Yamamuro, Zushi; Hiroyuki Hirano; Yoshiro Morimoto, both of Yokosuka, all of Japan

[73] Assignee: Nissan Motor Company, Limited, Yokohama, Japan

[21] Appl. No.: 362,490

[22] Filed: Mar. 26, 1982

[30] Foreign Application Priority Data

Mar. 28, 1981 [JP] Japan ................... 56-44747

[51] Int. Cl.³ .............................. F16H 11/06
[52] U.S. Cl. ........................ 474/28; 474/18
[58] Field of Search ............ 474/17, 18, 28, 70

[56] References Cited

U.S. PATENT DOCUMENTS

| | | | |
|---|---|---|---|
| 3,044,316 | 7/1962 | Forster | 474/18 X |
| 3,200,666 | 8/1965 | Schrodt et al. | 474/28 X |
| 3,596,528 | 8/1971 | Dittrich et al. | 474/28 X |
| 3,600,961 | 8/1971 | Rattunde et al. | 474/28 X |
| 4,229,988 | 10/1980 | Rattunde | 474/28 |
| 4,304,150 | 12/1981 | Lupo et al. | 74/677 |
| 4,387,608 | 6/1983 | Mohl et al. | 74/866 |
| 4,403,975 | 9/1983 | Rattunde | 474/18 |

FOREIGN PATENT DOCUMENTS

| | | | |
|---|---|---|---|
| 52356 | 10/1979 | Australia . | |
| 0027672 | 4/1981 | European Pat. Off. . | |
| 1256023 | 12/1967 | Fed. Rep. of Germany | 474/28 |
| 2200555 | 7/1973 | Fed. Rep. of Germany . | |
| 2703487 | 8/1977 | Fed. Rep. of Germany | 474/28 |
| 1229278 | 9/1960 | France | 474/28 |
| 2027041 | 9/1970 | France . | |
| 2027039 | 9/1970 | France . | |
| 2340487 | 2/1977 | France . | |
| 55-65755 | 5/1980 | Japan . | |
| 1525674 | 9/1978 | United Kingdom . | |
| 2033502 | 5/1980 | United Kingdom | 474/28 |

*Primary Examiner*—Leslie A. Braun
*Assistant Examiner*—Dwight Diehl
*Attorney, Agent, or Firm*—Schwartz, Jeffery, Schwaab, Mack, Blumenthal & Koch

[57] ABSTRACT

A method and a system for controlling a continuously variable transmission are disclosed wherein, upon varying fluid pressure within a cylinder chamber of a drive pulley, fluid pressure within a cylinder chamber of a driven pulley is kept constant, while, upon varying the fluid pressure within the cylinder chamber of the driven pulley, the fluid pressure within the drive pulley is kept constant.

3 Claims, 15 Drawing Figures

METHOD AND SYSTEM FOR CONTROLLING CONTINUOUSLY VARIABLE V-BELT TRANSMISSION

BACKGROUND OF THE INVENTION

1. Field of the Invention

The present invention relates to a method and a system for controlling a continuously variable V-belt transmission.

2. Description of the Prior Art

A continuously variable V-belt transmission is known from laid-open Japanese patent application No. Sho 55-65755 which corresponds to Australian Pat. No. 52,356/79, wherein a continuously variable ratio change is accomplished by adjusting V-shaped pulley groove of a drive pulley and a driven pulley to change the radius of the diameter at which a V-belt contacts each of the pulleys. It is a common practice to use a shift control valve as shown in FIG. 1A to distribute oil pressure between a drive pulley cylinder chamber and a driven pulley cylinder chamber. This shift control valve comprises a valve bore 201 formed with ports 201a, 201b, 201c, 201d and 201e, and a corresponding spool 202 to the valve bore 201 having lands 202a, 202b, 202c and 202d. Line pressure $P_L$ is supplied to the center port 201c, and the ports 201b and 201d on either side of the center port are connected to a drive pulley cylinder chamber and a driven pulley cylinder chamber, respectively, and the ports 201a and 201e are both drained off. The spool 202 has its left end, as received in FIG. 1A, linked with for example a shift operating mechanism which adjusts the axial position of the spool. The axial lengths of the lands 202b and 202c of the spool 202 are shorter than axial lengths of the ports 201b and 201d, respectively, and an axial distance $l_1$ between the outer side edge faces of the lands 202b and 202c is shorter than an axial distance L between outer side walls of the ports 201b and 201c. This structure permits the distribution of the line pressure from the port 201c between the ports 201b and 201d. A part of oil that flows to the ports 201b and 201d through clearances 203a and 204a, respectively, passes through clearances 203b and 204b to the ports 201a and 201e to be drained off. Therefore, the oil pressure at the port 201b and that at the port 201d are dependent upon the ratio between the clearances 203a and 203b and the ratio between the clearances 204a and 204b, that is, the oil pressure at the port 201b increases as the clearance 203a increases and the clearance 203b decreases and the oil pressure at the port 201d increases as the clearance 204a increases and the clearance 204b decreases. However, as the clearance 203a increases to cause the clearance 203b to decrease, the clearance 204a decreases to cause the clearance 204b to increase, resulting in the oil pressure at the ports 201b and 201d varying as shown in FIG. 1D where the variation in oil pressure is illustrated vs., stroke of the spool 202 along the abscissa. When the spool 202 has moved to the left limit position as shown in FIG. 1B, the oil pressures at the ports 201b and 201d are indicated by a point A shown in FIG. 1D and thus the line pressure appears at the port 201b and the pressure at port 201d is drained off. From this position if the spool 202 is moved gradually to the right, the oil pressure at the port 201b drops and the oil pressure at port 201d increases. When the spool 202 is at the center position (the position shown in FIG. 1A), the oil pressures are as indicated by B shown in FIG. 1D, resulting in that the oil pressures at the ports 201b and 201d being half of the line pressure. If the spool 202 is moved further to the right and reaches the position shown in FIG. 1C, the oil pressures are as indicated by the point C in FIG. 1D, resulting in the port 201b being drained off and the line pressure $P_L$ appearing at the port 201d. As is apparent from FIG. 1D, in response to the stroke of the spool 202, the oil pressure at the ports 201b and 201d, viz., the oil pressure within the drive pulley cylinder chamber and that within the driven pulley cylinder chamber, vary correlatedly, thus effecting a shift in accordance with the ratio between these oil pressures.

However, such conventional shift control valves, are designed so that the axial distance L between the ports is longer than the axial distance $l_1$, and always form clearances through which the line pressure is drained off whichever position the spool assumes. Thus an oil pump with a capacity high enough for compensating the leak of the oil pressure must be provided, and furthermore since the oil pressures supplied to the drive pulley cylinder chamber and the driven pulley cylinder chamber drop to half of the line pressure when for example the oil pressures within both of the pulley cylinder chambers are equal to each other (point B), it is difficult to ensure sufficient transmission torque capacity unless the level of the line pressure is kept high.

SUMMARY OF THE INVENTION

According to the present invention, a continuously variable transmission is controlled such that upon varying fluid pressure within a cylinder chamber of a drive pulley, fluid pressure within a cylinder chamber of a driven pulley is kept constant, while, upon varying the fluid pressure within the cylinder chamber of the driven pulley, the fluid pressure within the cylinder chamber of the drive pulley cylinder is kept constant.

An object of the present invention is to eliminate the above mentioned problem encountered in controlling a continuously variable transmission.

BRIEF DESCRIPTION OF THE DRAWINGS

The present invention is more specifically described in connection with the accompanying drawings, wherein:

FIGS. 1A, 1B and 1C are diagrammatic cross sections of the conventional shift control valve wherein FIG. 1A illustrates the state when the spool is in the center position, FIG. 1B the state when the spool is in the left limit position, and FIG. 1C the state when the spool is in the right limit position;

FIGS. 5, 6 and 7 are enlarged cross sections of the shift control valve used in the control system shown in FIG. 4 wherein FIG. 5 illustrates the state when the spool is in the center position, FIG. 6 the state when the spool is in the left limit position, and FIG. 7 the state when the spool is in the right limit position;

DETAILED DESCRIPTION OF THE INVENTION

The present invention is in part based on the recognition of the above mentioned conventional problems and has as an object the solution the above-mentioned problems by controlling shifting so that upon causing the oil pressure within the drive pulley cylinder chamber to vary, the oil pressure within the driven pulley cylinder chamber is kept constant and upon causing the oil pressure within the driven pulley cylinder chamber to vary, the oil pressure within the drive pulley cylinder chamber is kept constant.

Hereinafter, the present invention is explained based upon FIGS. 2 through 12 of the accompanying drawings illustrating a preferred embodiment thereof.

Figure 1A:
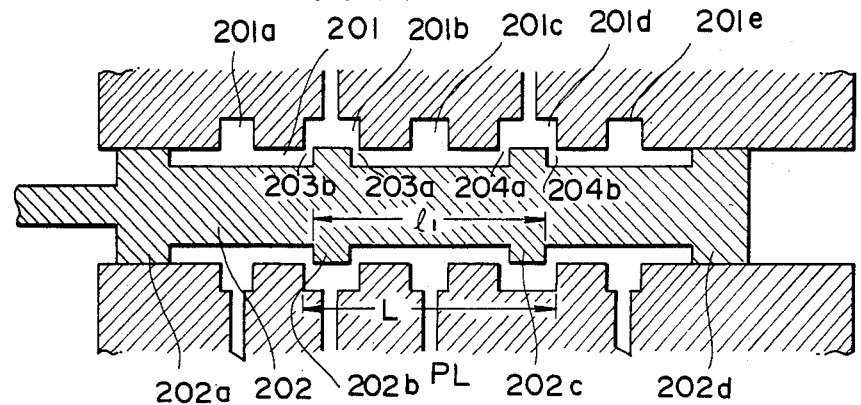
Figure 1B:
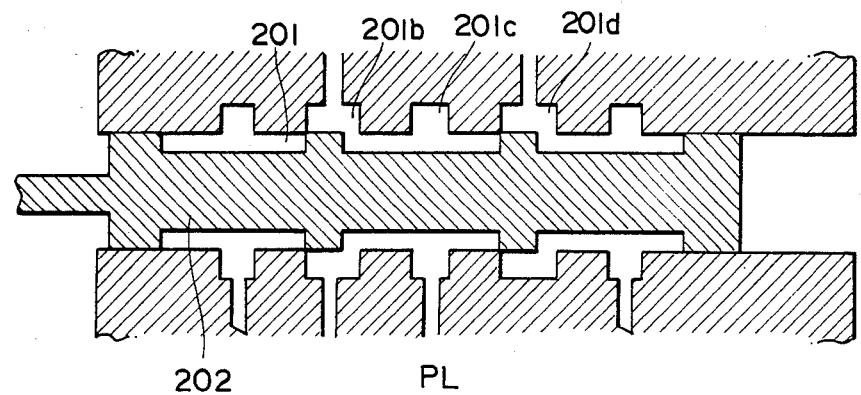
Figure 1C:
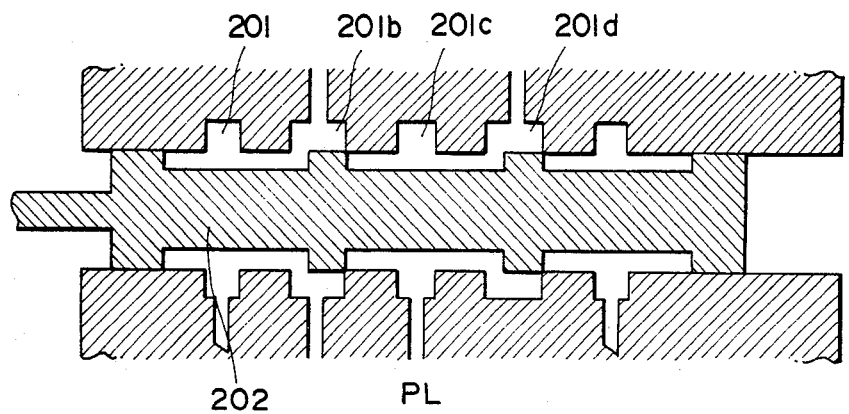
Figure 1D:
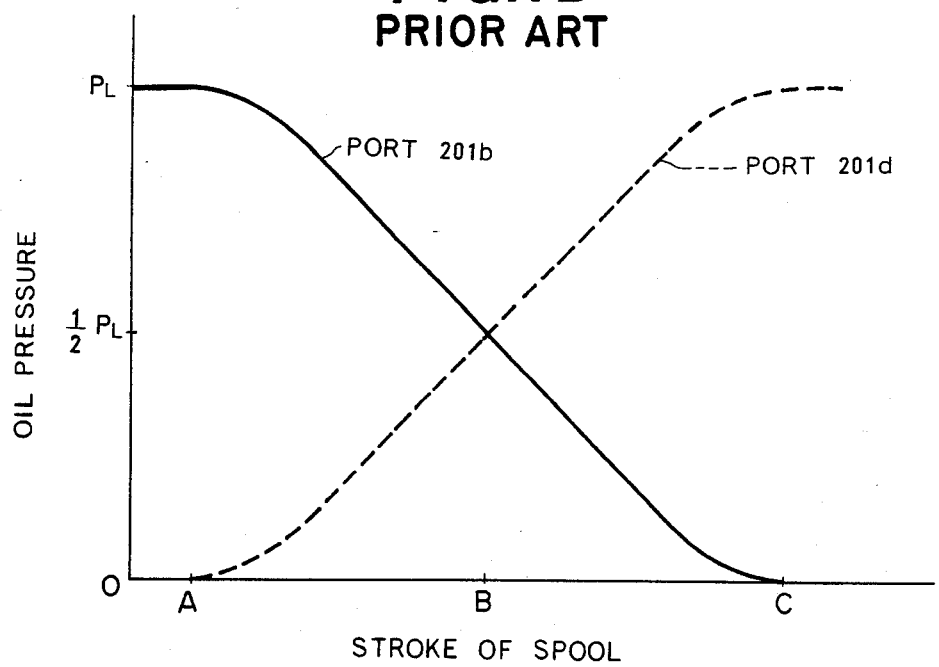
FIG. 1D is a graph showing the variation in oil pressure depending upon the states of the shift control valve as shown in FIGS. 1A through 1C.
Figure 2:
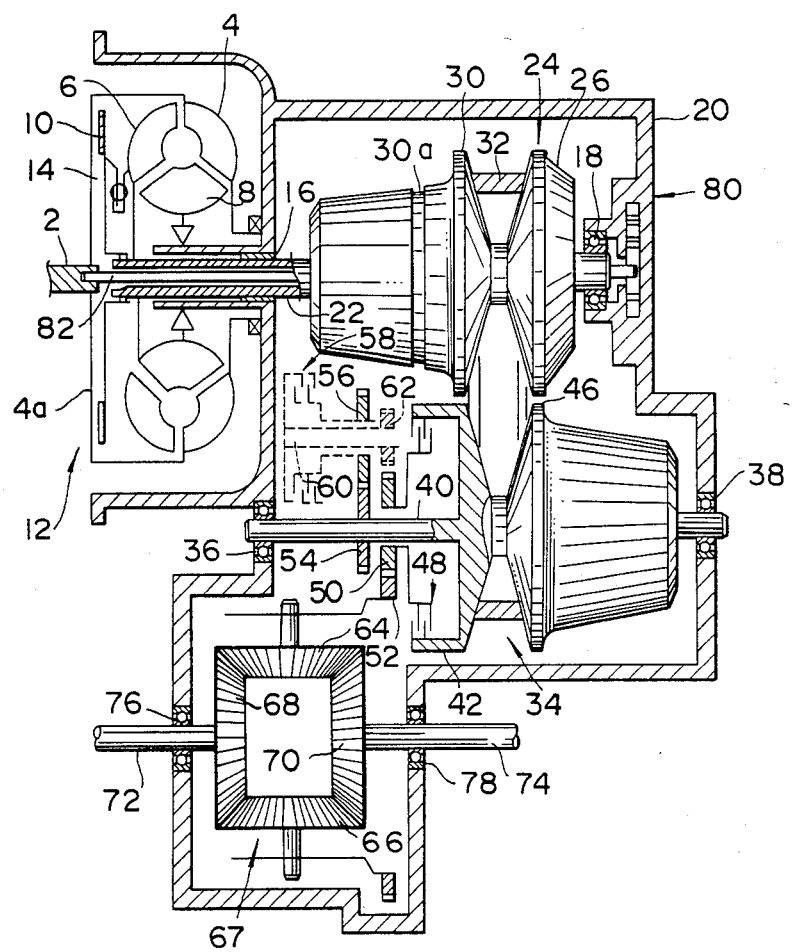
FIG. 2 is a diagrammatic view illustrating a power transmission mechanism of a continuously variable transmission.
Figure 3:
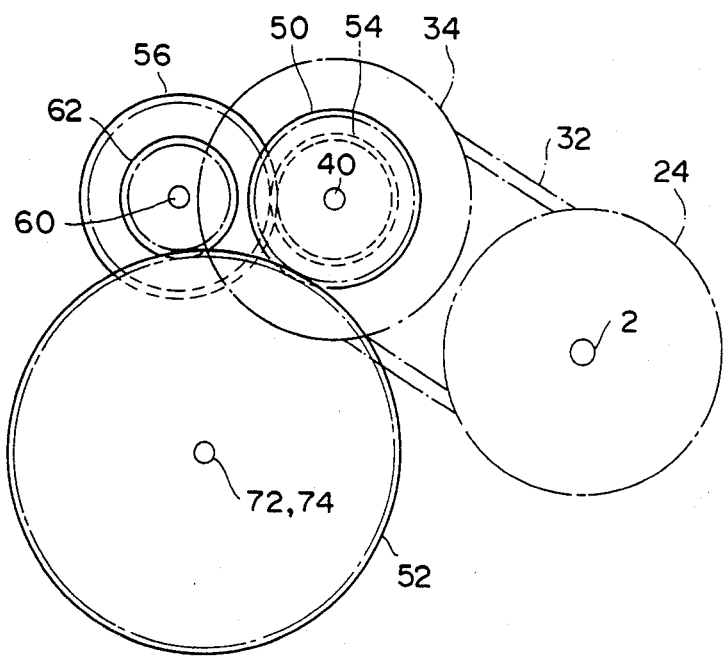
FIG. 3 is a layout of the shafts used in the continuously variable transmission shown in FIG. 2.

Firstly, a power transmission mechanism of a continuously variable transmission to which a control system according to the present invention is shown in FIGS. 2 and 3.

Figure 4:
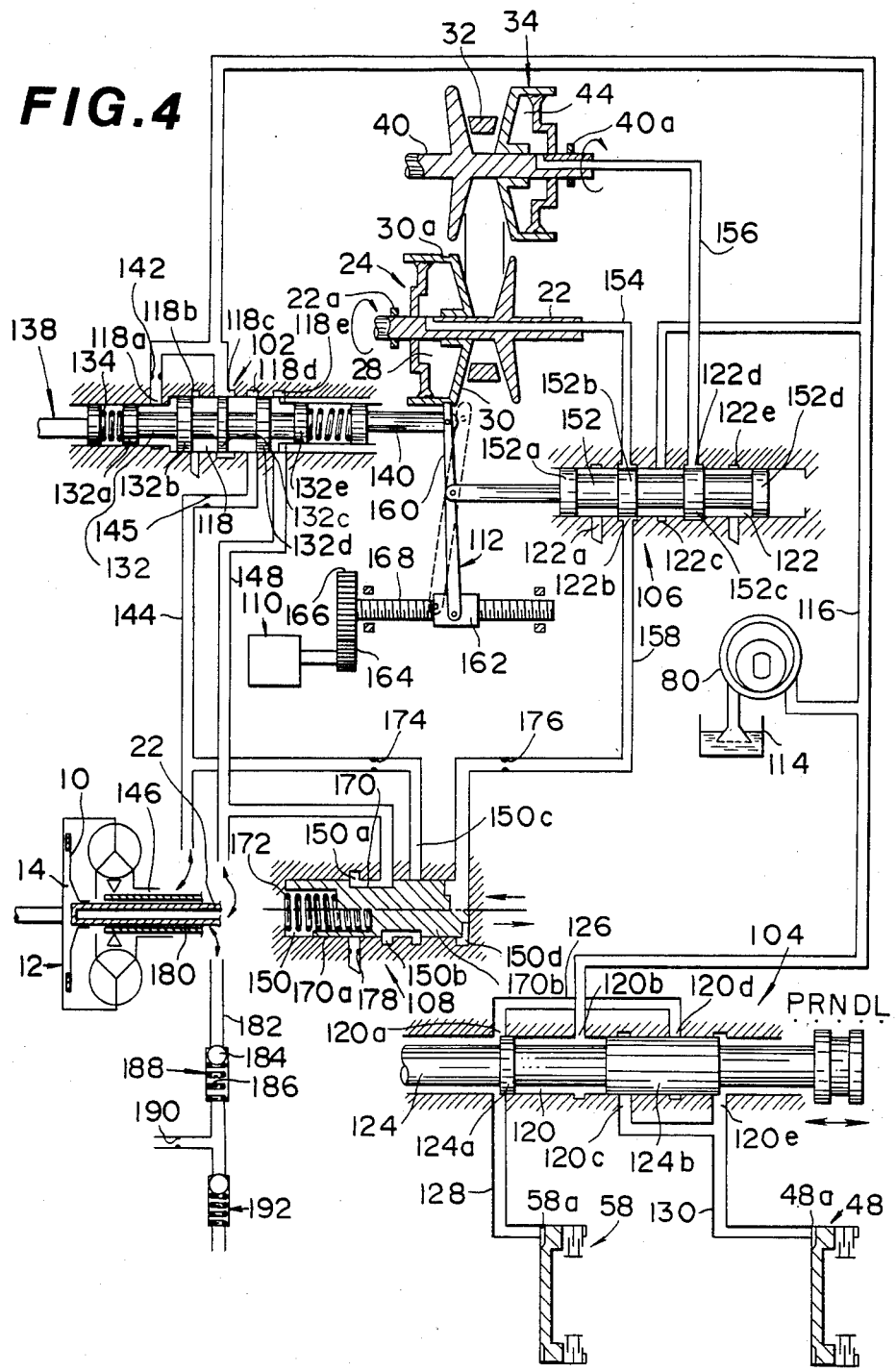
FIG. 4 is a hydraulic control system for the power transmission mechanism shown in FIG. 2.
Figure 5:
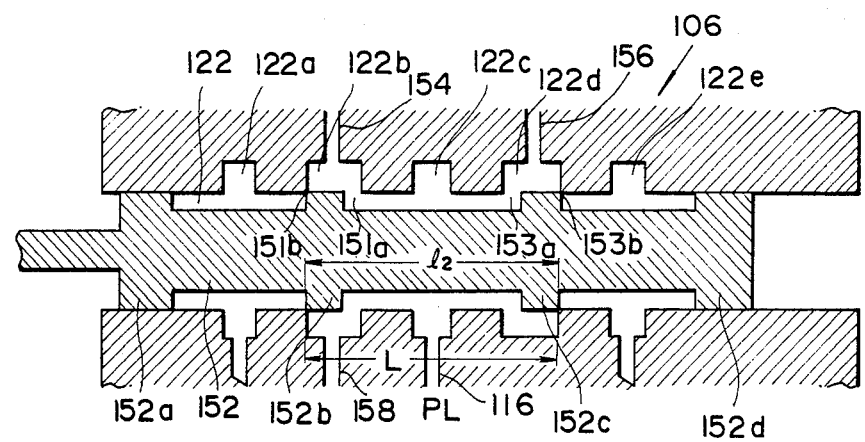
Figure 6:
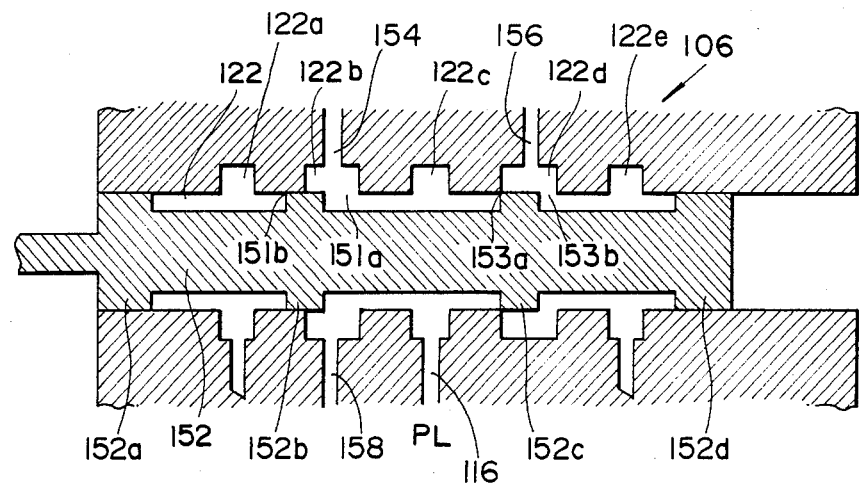
Figure 7:
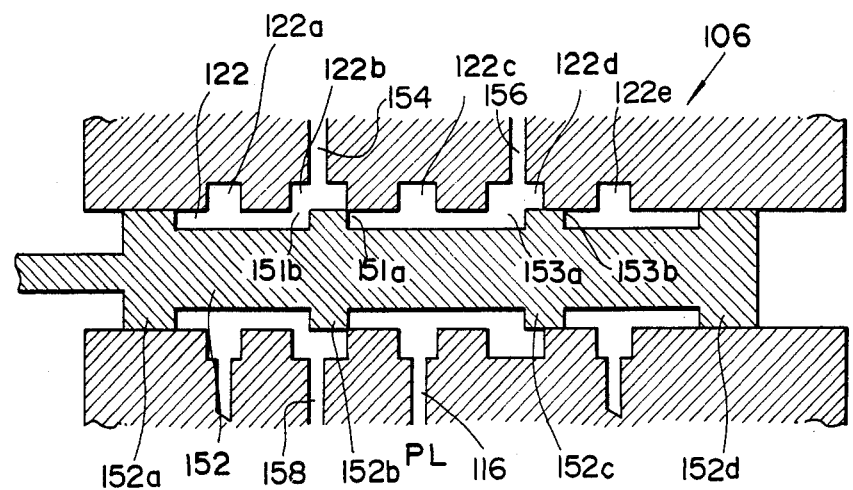

Turning now to FIG. 2, there is attached to an engine output shaft 2, rotatable in unison with a crankshaft of an engine (both not illustrated), is a torque converter 12 (which may be replaced with a fluid coupling) including a pump impeller 4, a turbine runner 6, a stator 8 and a lock-up clutch (lock-up device) 10. The lock-up clutch 10 is connected to the turbine runner 6 in an axially slidable manner and cooperates with a member (converter shell) 4a coupled with the engine output shaft 2 integral with the pump impeller 4 to define a lock-up clutch oil chamber 14 and operates such that when the oil pressure within the lock-up clutch oil chamber 14 becomes lower than that within the interior of the torque converter 12, this difference in oil pressure urges the lock-up clutch 10 to be pressed against the member 4a to come into unitary rotation therewith. The turbine runner 6 is splined to one end of a drive shaft 22 which is rotatably supported in a case 20 via bearings 16 and 18. Arranged on the drive shaft 22 between the bearings 16 and 18 is a drive pulley 24. The drive pulley 24 comprises an axially fixed conical disc 26 and an axially movable conical disc 30 which is disposed to face the axially fixed conical disc 26 to define a V-shaped pulley groove therebetween and which is allowed to slide in an axial direction of the driven shaft 22 in response to an oil pressure created within a drive pulley cylinder chamber 28 (see FIG. 4). The drive pulley 24 is drivingly connected to a driven pulley 34 via a V-belt 32, the driven pully 34 being arranged on a driven shaft 40 which is rotatably supported in the case 20 via the bearings 36 and 38. The driven pulley 34 comprises an axially fixed conical disc 42 fixed to the driven shaft 40 and an axially movable conical disc 46 which is disposed to face the fixed conical disc 42 in such a manner as to define a V-shaped pulley groove and which is allowed to slide in an axial direction of the driven shaft 40 in response to an oil pressure created in a driven pulley cylinder chamber 44 (FIG. 4). The axially fixed conical disc 42 is drivingly connectable via a forward drive multiple disc clutch 48 to a forward drive gear 50 rotatably supported on the driven shaft 40, this forward drive gear being in mesh with a ring gear 52. Fixed to the driven shaft 40 is a reverse drive gear 54 which is in mesh with an idle gear 56. The idle gear 56 is drivingly connectable via a reverse drive multiple disc clutch 58 to an idle shaft 60 which has fixed thereto another idle gear 62 that is in mesh with the ring gear 52. (Although in FIG. 2 the idle gear 62, idle shaft 60 and reverse drive multiple disc clutch 58 are illustrated in positions displaced from the actual positions thereof for ease of illustration. For example, the idle gear 62 and ring gear 52 are shown as out of mesh with each other, but, they are actually in mesh with each other as will be understood from FIG. 3.) The ring gear 52 has attached thereto a pair of pinion gears 64 and 66, output shafts 72 and 74 being coupled with side gears 68 and 70, respectively, which are in mesh with the pinion gears 64 and 66 to cooperate to form a differential 67. The output shafts 72 and 74 which are supported via bearings 76 and 78, respectively, extend outwardly of the case 20 in the opposite directions. The output shafts 72 and 74 are connected to road wheels (not shown). In the drawing, there is arranged on the right side of the bearing 18 an oil pump 80 of the internally toothed gearing type which serves as a source of oil pressure, oil pump 80 being driven by the engine output shaft 2 via an oil pump drive shaft 82 extending through the hollow driven shaft 22. Rotational power is fed from the engine output shaft 2 to the continuously variable transmission, viz., a combination of torque converter with lock-up mechanism, continuously variable transmission mechanism and differential, is transmitted via torque converter 12, drive shaft 22, drive pulley 24, V-belt 32, driven pulley 34 to driven shaft 40 and in the case the forward multiple disc clutch 48 is engaged with the reverse drive multiple disc clutch 58 released, the rotation of the shaft 40 is transmitted via the forward drive gear 50, ring gear 52 and differential 67 to the output shafts 72 and 74 to rotate them in the forward rotational direction. When the reverse drive multiple disc clutch 58 is engaged and the forward drive multiple disc clutch released, the rotation of the shaft 40 is transmitted via the reverse drive gear 54, idle gear 56, idle shaft 60, idle gear 62, ring gear 52 and differential 67 to the output shafts 72 and 74 to rotate them in the reverse rotational direction. During this transmission of power, the rotation ratio between the drive pulley 24 and driven pulley 34 may be varied by moving the axially movable conical disc 30 of the drive pulley 24 and the axially movable conical disc 46 of the driven pulley 34 in an axial direction so as to change the radii of the diameter contacting the V-belt 32. For example, increasing the width of the V-shaped pulley groove of the drive pulley 24 and decreasing the width of the V-shaped pulley groove of the driven pulley 34 causes a reduction in the contacting radius of the drive pulley 24 and an increase in the contacting radius of the driven pulley 34 with respect to the V-belt 32, resulting in an increase in reduction ratio. If the axially movable conical discs 30 and 46 are moved in the reverse directions, a reduction ratio is decreased. Depending upon power transmission circumstances, the torque converter serves as a torque multiplier or serves as a fluid coupling but, since it is provided with a lock-up clutch 10 attached to the turbine runner 6, the torque converter 12 can establish a direct mechanical connection between the engine output shaft 2 and driven shaft 22 when oil pressure is drained from the lock-up clutch oil chamber 14 to press the lock-up clutch 10 against the member 4a integral with the pump impeller 4.

Turning to FIG. 4 a hydraulic control system for the continuously variable transmission is illustrated. As shown in FIG. 4, the hydraulic pressure control system comprises an oil pump 80, line pressure regulator valve 102, a manual valve 104, shift ratio control valve 106, lock-up valve 108, shift motor 110, and a shift operating mechanism 112.

The oil pump 80 which is driven by the engine output shaft 2 as mentioned before discharges the oil within the tank 114 into the oil conduit 116. However, the oil pump drive shaft 82 is not illustrated in FIG. 4 for the sake of simplicity of illustration. The oil conduit 116 leads to ports 118a and 118c of the line pressure regulator valve 102 and the oil pressure therein is regulated into a line pressure. The oil conduit 116 communicates with a port 120b of the manual valve 104 and a port 122c of the control valve 106.

The manual valve 104 has a valve bore 120 provided with five ports 120a, 120b, 120c, 102d and 120e, and a spool 124 formed with two lands 124a and 124b received in the valve bore 120, which spool 124 is actuated by a shift lever (not shown) between five detent positions "P", "R", "N", "D" and "L". The port 120a is permitted to communicate not only with a port 120d via an oil conduit 126, but also with a cylinder chamber 58a of the reverse drive multiple disc clutch 58. A port 120c is permitted to communicate not only with a port 120e by an oil conduit 130, but also with a cylinder chamber 48a of a forward drive multiple disc clutch 48. The port 120b communicates with the oil conduit 116 to receive line pressure therein. When the spool 124 is set in "P" position, the port 120b supplied with the line pressure is covered by a land 124b, so that the cylinder chamber 58a of the reverse drive multiple disc clutch 58 is drained via the oil conduit 126 and port 120d and the cylinder chamber 48a of the forward drive multiple disc clutch 48 is drained via the port 120e. When the spool 124 is set in "R" position, the port 120b is permitted to communicate with the port 120a by a groove between the lands 124a and 124b so as to permit the line pressure to communicate with the cylinder chamber 58a for the reverse drive multiple disc clutch 58, whereas, the cylinder chamber 48a of the forward drive multiple disc clutch 48 is left drained via the port 120e. When the spool 124 is set in "N" position, the port 120b is disposed between the lands 124a and 124b and is prevented from communicating with the other ports, thus the cylinder chamber 58a of the reverse drive multiple disc clutch 58 and the cylinder chamber 48a of the forward drive multiple disc clutch 48 are drained via the port 120a and port 120e in a similar manner to the case when the spool is in "P" position. When the spool 124 is set in "D" or "L" position, the port 120b is permitted to communicate with the port 120c via the groove between the port 120b and 120c so that the line pressure is supplied to the cylinder chamber 48a of the forward multiple disc clutch 48, whereas, the cylinder chamber 58a of the reverse drive clutch 58 is drained via the port 120a. Therefore, when the spool 124 is set in "P" position or "N" position, both the forward drive multiple disc clutch 48 and reverse drive multiple disc clutch 58 are released to interrupt the transmission of power, thus preventing the rotation of output shafts 72 and 74. When the spool 124 is set in "R" position, the reverse drive multiple disc clutch 58 is engaged so as to drive the output shafts 72 and 74 in the reverse rotational direction. When the spool 124 is set in "D" or "L" position, the forward drive multiple disc clutch 48 is engaged so as to drive the output shafts 72 and 74 in the forward rotational direction. Although there is no difference with respect to the hydraulic circuit between "D" position and "L" position as mentioned above, both of the positions are electrically detected to actuate the shift motor 110 in such a manner as to effect a shift control in accordance with different shift patterns.

The line pressure regulator valve 102 comprises a valve bore 118 provided with five ports 118a, 118b, 118c, 118d and 118e, a spool 132 formed with five lands 132a, 132b, 132c, 132d and 132e, and springs 134 and 136 arranged on the both ends of the spool 132. It is to be noted that the lands 132a and 132e provided on the both end portions of the spool 132 are smaller in diameter than the intermediate lands 132b, 132c and 132d. The left side spring 134 is disposed between the left end of the spool 132 and a throttle link 138, which throttle link 138 is urged for leftward movement as the throttle opening degree increases or for rightward movement as the throttle opening degree decreases. Therefore, if the throttle opening is great, the force created by the spring 134 urging the spool 132 rightwardly is small, whereas, if the throttle opening degree is small, the force by the spring 134 urging the spool rightwardly is great. A right side spring 136 is disposed between the right end of the spool 132 and a rod 140 cooperating with the axially movable conical disc 30 of the drive pulley 24. Therefore, if the axially movable conical disc 30 of the drive pulley 24 has moved rightwardly (viz., in the case a reduction ratio has decreased), the force by the spring 136 urging the spool 132 leftwardly decreases, whereas, if the axially movable conical disc 30 has moved leftwardly (viz., in the case a reduction ratio is increased), the force by the spring 136 urging the spool 132 leftwardly increases. As mentioned before, the ports 118a and 118c of the line pressure register valve 102 are supplied with the output oil discharged by the oil pump 80, the inlet to the port 118a being provided with an orifice 142. The port 118b is always drained. The port 118d is connected by an oil conduit 144 to an inlet port 146 of the torque converter and a port 150c of the lock-up valve 108. The port 118e communicates via an oil conduit 148 with the lock-up clutch oil chamber 14 within the torque converter 12 and with a port 150b of the lock-up valve 108. For preventing the application of an excessive pressure to the interior of the torque converter 12, the oil conduit 144 is provided with an orifice 145. Applied to the spool 133 of the line pressure regulator valve 102 are two forces in the rightward direction, one by the spring 134 and the other by the line pressure acting on a differential area between the lands 132a and 132b; and two forces in the leftward direction, one by the spring 136 and the other by the pressure at the port 118e acting upon a differential area between the land 132d and 132e. The spool 132 adjusts the amount of drainage of the oil at the ports 118c via the port 118d and 118b (first the oil is drained via the port 118d into the oil conduit 144, and if it cannot afford the adjustment, the oil is drained via the port 118b, as well), thus regulating the line pressure to balance the forces in the leftward and rightward directions. Therefore, the line pressure increases as the throttle opening degree increases, as a reduction ratio increases, and as the pressure at the port 118e (viz., the oil pressure building up within the lock-up clutch oil chamber 14) increases. (In this case, the torque converter 12 is in its non-lock-up state because the oil pressure in the chamber 14 is high.) The adjustment of the line pressure in this manner meets the actual demands, viz., the oil pressure must be increased to increase a force with which the pulleys are urged against the V-belt 32 so as to increase the torque transmission capacity which increases with increase in friction because the output torque of the engine increases as the throttle opening degree increases and the multiplication of the torque increases as the reduction ratio increases. Moreover, the oil pressure must be increased to increase the transmission torque to deal with the multiplication function of the torque by the torque converter 12 when it operates in a non-lock-up state prior to lock-up.

As the above mentioned rightwardly directed force acting upon the spool 132 via spring 134 in response to the engine output torque, a force due to a diaphragm device which is operative to create the force in response to an engine induction vacuum may be used instead of the force in response to the throttle opening degree. In this case the setting is made such that when the induction vacuum is high the force due to the spring 134 increases, whereas, when the induction vacuum is low, the force due to the spring 134 decreases, so that a similar result to that obtained in the use of the throttle opening is obtained.

The shift control valve 106 has a valve bore 122 formed with five ports 122a, 122b, 122c, 122d and 122e, and a spool 152 received in the valve bore 122 and formed with four lands 152a, 152b, 152c and 152d. The center port 122c communicates with the oil conduit 116 which is supplied with the line pressure, the left port 122b and right port 122 d communicate via respective conduits 154 and 156 with the drive pulley cylinder chamber 28 of the drive pulley 24 and the driven pulley cylinder chamber 44 of the driven pulley 34. The port 122b communicates via an oil conduit 158 with a port 150d of the lock-up valve 108, too. Both of the end ports 122a and 122e are drained. The left end of the spool 152 is linked to a substantially middle portion of a lever 160 of the later-mentioned shift operating mechanism 112. The axial length of each of the lands 152b and 152c is slightly smaller than the width of the corresponding one of the ports 122b and 122d, whereas, the axial length between the lands 152b and 152c is substantially the same as the axial length between the ports 122b and 122d. Therefore, a portion of the line pressure supplied via the port 122c to the oil chamber between the lands 152b and 152c is allowed to pass through a clearance formed between the land 152b and the port 122b to flow into an oil conduit 154, but the remaining portion thereof is allowed to pass through another clearance formed between the land 152b and the port 122b to be drained, so that the pressure with the oil conduit 154 is determined depending upon the ratio between the areas of the above-mentioned clearances. In a similar manner, the pressure within the oil conduit 156 is determined depending upon the ratio of the areas of clearances formed between the edges of the land 152c and the port 122d. Therefore, if the spool 152 is disposed in the center position, the relationship of the land 152b with the port 122b becomes equal to that of the land 152c with the port 122d, thus causing the pressure in the oil conduit 154 to become equal to that in the oil conduit 156.

As the spool 152 moves leftwardly, the clearance of the port 122b on the line pressure side increases and the clearance thereof on the drain side decreases, thus allowing the pressure in the oil conduit 154 to increase accordingly, whereas, the clearance of the port 122d on the line pressure side decreases and the clearance thereof on the drain side increases, thus causing the pressure in the oil conduit 156 to decrease accordingly. This causes an increase in pressure in the drive pulley cylinder chamber 28 of the drive pulley 24, resulting in a decrease in the width of the V-shaped pulley groove, and a reduction in pressure in the driven pulley cylinder chamber 44 of the driven pulley 34, resulting in an increase in the width of the V-shaped pulley groove, so that because the radius of the diameter of the drive pulley 24 contacting with the V-belt increases and the radius of the diameter of the driven pulley 34 contacting with the V-belt decreases, a reduction ratio decreases. Conversely, urging the spool 152 to move rightwardly causes the reverse action to that mentioned above to cause an increase in the reduction ratio.

The lever 160 of the shift operating mechanism 112, which lever is pin connected at its middle portion with the spool 152 of the shift control valve 106, has one end received in an annular groove 30a formed in the axially movable conical disc 30 of the drive pulley 24 and has its opposite end pin connected with the sleeve 162. The sleeve 162 is internally threaded to mesh with the thread formed on the shaft 168 which is rotatable by the shift motor 110 via the gears 164 and 166. With this shift operating mechanism 112, if the shift motor 110 is rotated to rotate the shaft 168 via the gears 164 and 166 in one rotatioal direction to cause the sleeve 162 to move leftwardly, the lever 160 moves in a clockwise rotational direction with its end portion received by the annular groove 30a of the axially movable conical disc 30 of the drive pulley 24 as an fulcrum point, causing the leftward movement of the spool 152 connected to the lever 160 of the shift control valve 106. This causes a rightward movement of the axially movable conical disc 30 of the drive pulley 24 in a manner mentioned before to decrease the width of the V-shaped pulley groove, while, at the same time, the width of the V-shaped pulley groove of the driven pulley 34 increases, thus resulting in a reduction in the reduction ratio. Since one end of the lever 160 is engaged with the groove 30a around the outer periphery of the axially movable conical disc 30, urging the axially movable conical disc 30 to the right will rotate the lever 160 clockwise with the end of the lever 160 which is pin connected with the sleeve 162 acting as a fulcrum. This causes the spool 152 to move back rightwardly, tending to cause the drive pulley 24 and driven pulley 34 to assume a low reduction ratio. This action causes the spool 152 and the drive pulley 24 and driven pulley 34 to assume a reduction ratio depending upon the amount of rotation of the shift motor 110 in a similar manner as if the shift motor 110 is rotated in the reverse direction. Therefore, if the shift motor 110 is actuated in accordance with a predetermined shift pattern, the reduction ratio varies accordingly, thus making it possible to control the shift ratio of the continuously variable transmission by controlling the shift motor 110, alone.

The shift motor 110 is controlled by a control unit, not illustrated, which detects a revolution speed of the drive pulley 24 and a parameter indicative of the output torque of the engine, such as a throttle opening degree. A desired value of engine revolution speed is determined using a predetermined function which defines for any value of the parameter indicative of the output torque of the engine, a desired value of engine revolution speed. The control unit operates the shift motor to control the reduction ratio in such a manner as to maintain the revolution speed of the drive pulley in a predetermined relationship with the desired value in engine revolution speed. The control method and apparatus are described in co-pending U.S. application Ser. No. 362,489 entitled "Method and apparatus for controlling continuously variable V-belt transmission," filed concurrently with the present application by the same inventors and commonly assigned herewith, the disclosure of which application is hereby incorporated by reference in its entirety.

The lock-up valve 108 comprises a valve bore 150 formed with four ports 150a, 150b, 150c and 150d, a spool 170 having two lands 170a and 170b, and a spring 172 biasing the spool 170 rightwardly. The port 150d communicates with a port 122b of the shift control valve 106 through an oil conduit 158, the ports 150b and 150c communicate respectively through oil conduits 148 and 144 with the port 118e of the line pressure regulator valve 102 and the port 118d thereof, and the port 150a is drained. The oil conduits 144 and 158 and a drain oil conduit extending from the port 150a are provided with orifices 174, 176 and 178, respectively. The same oil pressure as that applied to the torque converter inlet port 146 is applied to the port 150c via the oil conduit 144, but when the oil pressure applied to the port 150d via the oil conduit 158 (the same oil pressure as that within the drive pulley cylinder chamber 28) is high enough as to press the spool 170 to the left against the force of the spring 172, the port 150c is blocked by the land 170b and the port 150b is drained via the port 150a. Therefore, the lock-up clutch oil chamber 14 which communicates with the port 150b via the oil conduit 148 is drained, thus permitting the lock-up clutch 10 to assume an engaged state by the pressure within the torque converter 12, thereby placing the torque converter in a lock-up state. Conversely, if the oil pressure at the port 150d decreases to cause a leftwardly directed force to become smaller than a rightwardly directed force due to the spring 172, spool 170 moves rightwardly to a position wherein the port 150b is allowed to communicate with the port 150c. This causes the oil conduit 148 to communicate with the oil conduit 144, allowing the same oil pressure as that applied to the torque converter inlet port 146 to reach the lock-up clutch oil chamber 14, allowing the pressures on the both sides of the lock-up clutch 10 to become equal to each other, resulting in the release of the lock-up clutch 10. The orifice 178 is provided to prevent rapid drainage of the oil pressure from the lock-up clutch oil chamber 14 so as to alleviate shock upon shifting into lock-up state. The orifice 174 is provided in the oil conduit 144 to permit a gradual increase in oil pressure within the lock-up chamber 14 so as to alleviate a shock upon release from the lock-up state. An orifice 176 is provided in an oil conduit 158 to prevent the occurrence of chattering in the lock-up valve 108 owing to small variations in oil pressure in the drive pulley cylinder chamber 28.

The torque converter outlet port 180 communicates with the oil conduit 182 which is provided with a relief valve 188 including a ball 184 and a spring 186. With this relief valve, the pressure within the torque converter 12 is maintained at a constant pressure. The oil downstream of the relief valve 188 is introduced by an oil conduit 190 to an oil cooler and a lubricant circuit, both (unillustrated), and is finally drained. Any excessive oil is drained by another relief valve 192. The drained oil is returned to a tank 114.

Figure 8:
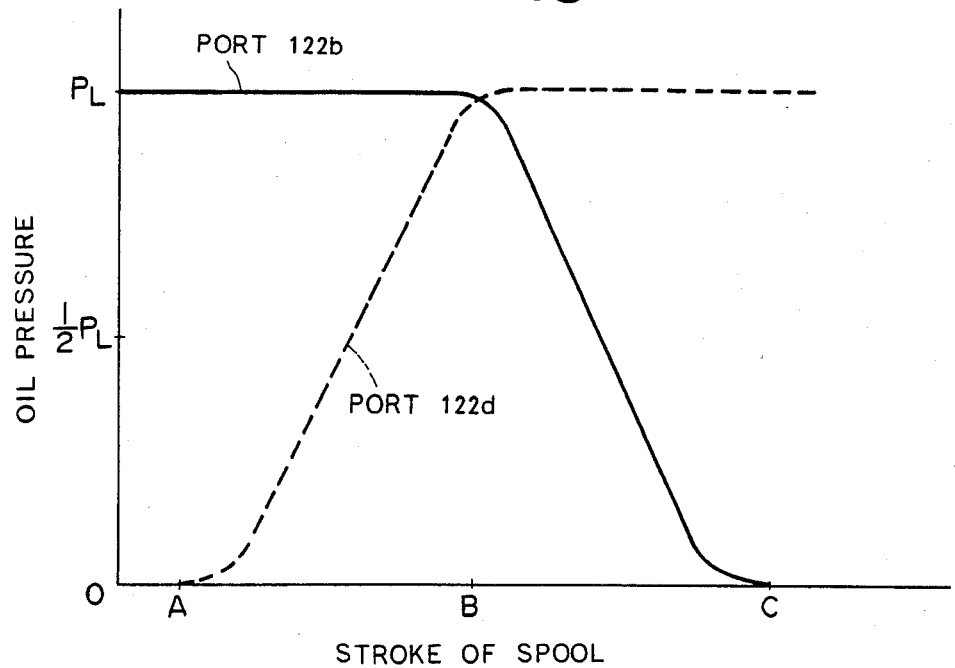
FIG. 8 is a graph illustrating the oil pressure variation provided by the shift control valve as shown in FIGS. 5 through 7.
Figure 9:
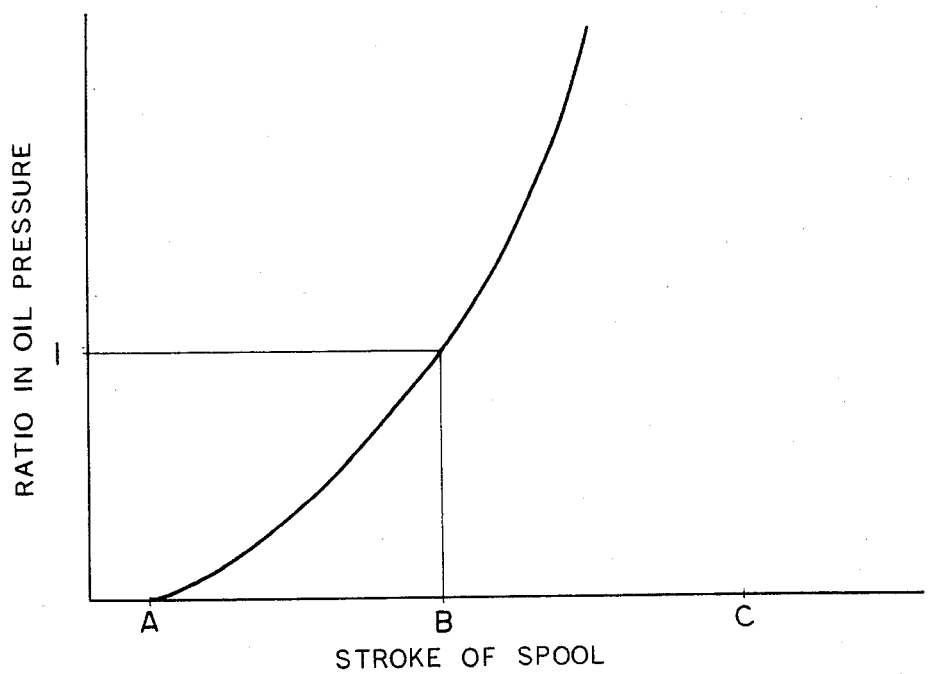
FIG. 9 is a graph illustrating a characteristic curve of the ratio of oil pressure vs., stroke of the spool.

Although the continuously variable transmission and its control system have been explained above generally, the shift control valve 106 according to the present invention is hereinafter explained in more detail in connection with FIGS. 5 through 12. As previously described, the shift control valve 106 comprises valve bore 122 provided with ports 122a, 122b, 122c, 122d and 122e, and a corresponding spool 152 to the valve hole provided with lands 152a, 152b, 152c and 152d. Line pressure is supplied to the center port 122c from the oil conduit 116. The ports 122b and 122d, disposed on the opposite sides of the center port 122c, are connected to the drive pulley cylinder chamber 28 and driven pulley cylinder chamber 44 through oil conduits 154 and 156, respectively, and the ports 122a and 122e are drained off. As previously described, the spool 152 is linked at the left end thereof to the shift operating mechanism 112 which adjusts the axial position thereof. The axial lengths of the lands 152b and 152c of the spool 152 are shorter than the axial distances of the ports 122b and 122d, respectively, and an axial distance $l_2$ between outer side edge faces of the lands 152b and 152c is substantially equal to an axial distance L between outer side walls of the ports 122b and 122d. According to this construction, although the line pressure at the port 122c is distributed to the ports 122b and 122d, part of oil that flows into the ports 122b and 122d through clearances 151a and 153a is allowed to flow through clearances 151b and 153b to the ports 122a and 122e to be drained off. Therefore, oil pressures at the ports 122b and 122d are determined dependent upon the ratio between the clearances 151a and 151b and the ratio between the clearances 153a and 153b. That is, the oil pressure at the port 122b increases as the clearance 151a increases and the clearance 151b decreases, while, the oil pressure at the port 122d increases as the clearance 153a increases and the clearance 153b decreases. But, since $L=l_2$, the clearances 151b and 153b are not allowed to open simultaneously, thus allowing the oil pressures at the ports 122b and 122d to vary against the stroke of the spool 152 as shown in FIG. 8. When the spool 152 has moved leftwardly to the position shown in FIG. 6, the oil pressures at the ports 122b and 122d are at a state indicated by A as shown in FIG. 8, resulting in the oil pressure at the port 122b being at the line pressure $P_L$ and the port 122 being drained off. When the spool 152 is moved rightwardly from this state, the clearance 152a increases and the clearance 153b decreases, thus allowing the oil pressure at the port 122d to increase. However, since the spool 151b is kept closed, the line pressure at the port 122b is maintained. Although, during this process, the amount of oil required to compensate for the loss of oil flowing to the port 122d through the clearance 153a tends to increase, due consideration is made to prevent the line pressure introduced to the port 122b from being affected by increasing the flow resistance of the oil conduit 116 in such a manner that when the spool 152 has reached the center position (the state in FIG. 5), the oil pressure are as indicated at B in FIG. 8, wherein the clearances 151b and 153b are simultaneously closed and the oil pressure at the ports 122b and 122d both become the line pressure $P_L$. If the spool 152 is urged to the right to the position shown in FIG. 7, oil pressure as indicated by C as shown in FIG. 8 are set wherein the clearance 151b is opened to drain off the port 122b, and the line pressure at the port 122d is maintained. Because the oil pressures vary as shown in FIG. 8, the ratio between the oil pressures at the ports 122b and 122d (that is, the ratio of oil pressures within the drive pulley cylinder chamber 28 and driven pulley cylinder chamber 44) vary as shown in FIG. 9, wherein the variation is expressed as a ratio.

Figure 10:
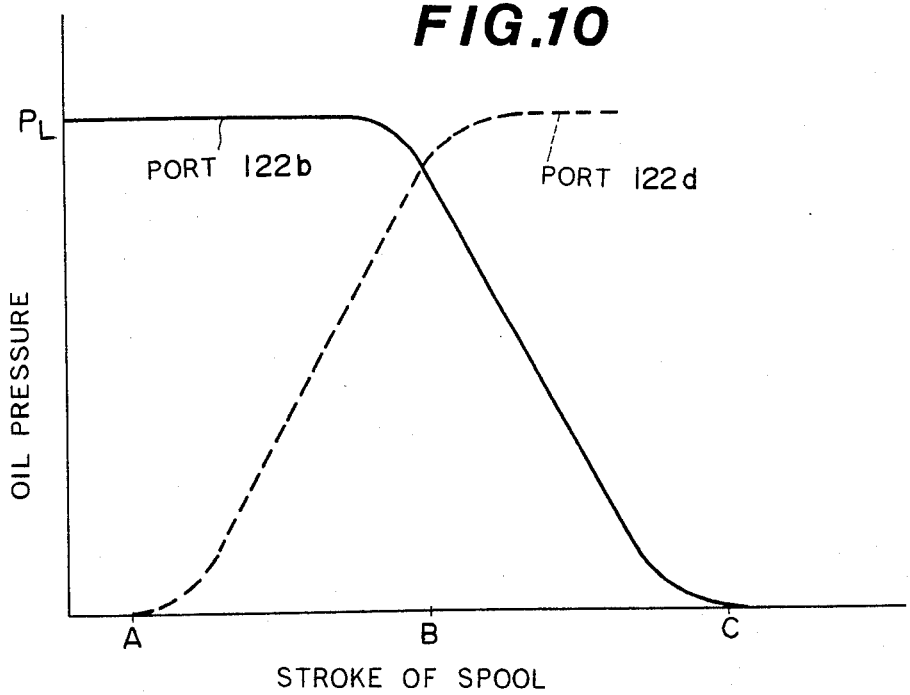
FIG. 10 is a graph illustrating the variation in oil pressure of a shift control valve according to the present invention.

When the spool 152 moves in the vicinity of the center position thereof, its response, in terms of a change in ratio against the actuation of the shift operating mechanism 112 is slow because the variation in oil pressures against variation in stroke of the spool 152 is small. The response in change in ratio against the stroke of the spool 152 may be improved if the axial distance $l_2$ *is set slightly shorter than the axial length L such that the oil pressure at the ports* 122b and 122d vary as shown in FIG. 10. Accordingly, as used herein, the an expression "the axial distance $l_2$ is substantially equal to the axial length L" is intended to include the case wherein the axial distance $l_2$ is slightly shorter than the axial distance L.

Figure 11:
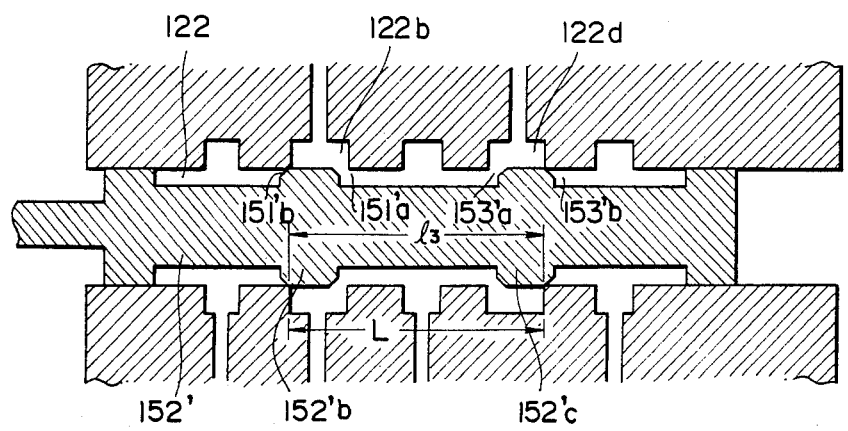
FIG. 11 is a cross section of a second embodiment of a shift control valve according to the present invention.
Figure 12:
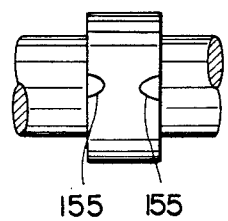
FIG. 12 is a front elevation of a spool formed with cutout.

FIG. 11 illustrates a second embodiment according to the present invention. The difference from the first embodiment is in that edges of lands 152'b and 152'c of a spool 152' are chamfered so as to make the variation in oil flow smooth upon opening and closing of clearances 151'a and 151'b, 153'a and 153'b. In this case, an axial distance $l_2$ that should be substantially equal to an axial distance L between the chamfered portions as viewed in the Figure. The chamfered portions may be replaced with cutouts 155 formed in the land as shown in FIG. 12.

As having been described, since, according to the present invention, the oil pressure within the driven pulley cylinder chamber is kept constant upon causing the oil pressure within the drive pulley cylinder chamber to vary and the oil pressure within the drive pulley cylinder chamber is kept constant upon causing the oil pressure within the driven pulley cylinder chamber to vary during the process of controlling the shift. The drainage in oil during the shift control may be made little, obviating the need for a large capacity oil pump, and furthermore the oil pressures within the drive pulley cylinder chamber and driven pulley cylinder chamber may be kept high to maintain high torque transmission capacity by the pulley.

What is claimed is:

1. A system for controlling a continuously variable transmission having a V-belt connecting a drive and a driven pulley, said drive pulley having a first cylinder chamber and first and second conical discs, said driven pulley having a second cylinder chamber and third and fourth conical discs, the first conical disc being secured to a drive shaft, the third conical disc being secured to a driver shaft, the second conical disc being controllably movable in an axial direction with respect to the drive shaft in response to a fluid pressure in the first cylinder chamber, the fourth conical disc being controllably movable in an axial direction with respect to the driven shaft in response to a fluid pressure in the second cylinder chamber, the hydraulic control system comprising:

means for supplying hydraulic fluid to said first and second cylinder chambers; and a shift control valve means connected to said supplying means for receiving the hydraulic fluid and for regulating a fluid supply to and discharge from the first and second cylinder chambers, said shift control valve means having a valve bore formed with a first port connected to receive the hydraulic fluid from said supplying means, a second port communicating with the first cylinder chamber and a third port communicating with the second cylinder chamber, the second and third ports being spaced from and disposed on opposite sides of the first port, the shift control valve means including a spool means operable for maintaining the fluid pressure within said first cylinder chamber substantially constant when varying the fluid pressure within said second cylinder chamber and for maintaining the fluid pressure within said second cylinder chamber substantially constant when varying the fluid pressure in said first cylinder chamber, said spool means being slidable within the valve bore, the spool means having a first land and a second land which cooperate with the second and third ports respectively, the first and second lands having axial lengths which are shorter than axial widths of the second and third ports respectively, and wherein an axial distance between outer side edge faces of the first and second lands is substantially equal to an axial distance between outer side walls of the second and third ports, such that said first and second lands cooperate with said second and third ports in a first position to provide a substantially equal pressure to both the first cylinder chamber and the second cylinder chamber, and such that, as said spool begins to move in a first direction from said first position, the pressure in one of said cylinder chambers constantly varies while the pressure in the other of said cylinder chambers remains constant, and as said spool begins to move in an opposite direction from said first position, the pressure in the other of said chambers constantly varies while the pressure in said one chamber remains constant.

2. A system as claimed in claim 1, wherein the first and second lands of the spool are chamfered.

3. A system as claimed in claim 1, wherein said first and second lands are formed with cutouts.

* * * * *